(12) United States Patent
Nakano

(10) Patent No.: US 6,702,377 B2
(45) Date of Patent: Mar. 9, 2004

(54) VEHICLE SEAT BACK ASSEMBLY

(75) Inventor: Nobuyuki Nakano, Kanagawa-ken (JP)

(73) Assignee: Johnson Controls Automotive Systems Corporation, Ayase (JP)

(*) Notice: Subject to any disclaimer, the term of this patent is extended or adjusted under 35 U.S.C. 154(b) by 69 days.

(21) Appl. No.: 10/021,179

(22) Filed: Oct. 29, 2001

(65) Prior Publication Data

US 2002/0050729 A1 May 2, 2002

(30) Foreign Application Priority Data

Oct. 30, 2000 (JP) ........................................ 2000-331117

(51) Int. Cl.⁷ ................................................ B60N 2/42
(52) U.S. Cl. ................................. 297/216.12; 297/408
(58) Field of Search .............................. 297/216.12, 408

(56) References Cited

U.S. PATENT DOCUMENTS

| | | | | |
|---|---|---|---|---|
| 3,802,737 A | * | 4/1974 | Mertens ................... | 297/216.2 |
| 5,378,043 A | * | 1/1995 | Viano et al. ................ | 297/408 |
| 5,795,019 A | * | 8/1998 | Wieclawski ............ | 297/216.12 |
| 5,884,968 A | * | 3/1999 | Massara ................ | 297/216.12 |
| 5,927,804 A | * | 7/1999 | Cuevas ................... | 297/216.12 |
| 6,199,947 B1 | * | 3/2001 | Wiklund ................ | 297/216.12 |
| 6,250,714 B1 | * | 6/2001 | Nakano et al. ........ | 297/216.12 |
| 6,273,511 B1 | * | 8/2001 | Wieclawski ............. | 297/463.1 |
| 6,375,262 B1 | * | 4/2002 | Watanabe ................ | 297/284.4 |
| 6,416,125 B1 | * | 7/2002 | Shah et al. ............ | 297/216.12 |

FOREIGN PATENT DOCUMENTS

| | | |
|---|---|---|
| EP | 0 995 631 A1 | 4/2000 |
| EP | 1 078 811 A1 | 2/2001 |
| JP | 10-119619 | 5/1998 |
| JP | 2001-039194 * | 2/2000 |
| JP | 2000-201770 * | 7/2000 |
| JP | 2000-217660 * | 8/2000 |

OTHER PUBLICATIONS

European Search Report for Application No. EP 01 30 9103, dated Nov. 21, 2003.

* cited by examiner

*Primary Examiner*—Peter M. Cuomo
*Assistant Examiner*—Joseph Edell
(74) *Attorney, Agent, or Firm*—Foley & Lardner

(57) ABSTRACT

A vehicle seat back assembly is provided with: a seat back frame including, at both sides thereof, at least side frames; a head rest support member supported with upper distal ends of the side frames to be rotatable; a pressure receiving member supported with the head rest support member and remaining in a position to receive an impact load caused by a rear-end collision of a vehicle; a head rest holder supported with the head rest support member; and a head rest supported with the head rest holder to be moveable in upper and lower directions. The head rest support member has an upper wall segment, a rear facing wall segment bent from the upper wall segment and extending downward, and a support section supporting the head rest holder at the upper wall segment and a portion extending from the rear facing wall segment.

10 Claims, 8 Drawing Sheets

VEHICLE SEAT BACK ASSEMBLY

BACKGROUND OF THE INVENTION

The present invention relates to a seat assembly for a vehicle and, more particularly, to a vehicle seat back assembly which protects a neck portion of a seat occupant in the vehicle such as a cervical vertebrae of the seat occupant during so-called a rear-end collision caused by other vehicle.

In the past, it has heretofore been proposed to provide a vehicle seat back assembly as disclosed in Japanese Patent Application Laid-Open Publication No. 10-119619 wherein the seat back assembly includes a lateral frame member composed of side frames having upper distal ends formed with forwardly extending pivot hinges, and a pressure receiving member responsive to the rear-end collision.

With such a structure, when the vehicles encounters the rear-end collision, the seat back assembly is initially exerted with an impact load (hereinafter referred to as a primary collision) applied in a forward direction of the vehicle and is subsequently subject to a reactive load (hereinafter referred to as a secondary collision) applied in a rearward direction owing to a body per se of a seat occupant. Thus, the pressure receiving member is exerted with the reactive load. When this occurs, the pressure receiving member is moved rearward, causing the lateral frame member to rotate in the forward direction about the centers of the pivot hinges such that the head rest supported with the lateral frame member is moved toward the head of the seat occupant to allow the head rest to move in a direction in close proximity to the head of the seat occupant.

Accordingly, even when the seat back assembly is flexed rearward responsive to the reactive load of the seat occupant during the rear-end collision of the vehicle, the pressure responsive member is responsive to the reactive load to instantaneously cause the head rest to move closer to the head of the seat occupant in accordance with the principle of leverage and, therefore, the head of the seat occupant is reliably retained with the head rest to thereby protect the cervical vertebrae of the seat occupant.

SUMMARY OF THE INVENTION

With such a structure, however, since the lateral frame member is constructed of three pieces of component parts including an upper side member, a rear side member and a lower side member, which are welded together by a welding technique, the respective component parts undergo a distortion due to the welding technique, with a resultant unbalance caused in operating forces of a stay of the head rest which are supported with the upper and lower side members. Thus, it is required to eliminate such an unbalance in the operating forces of the stays of the head rest.

The present invention has been made with a view of the aforementioned studies and has an object to provide a vehicle seat back assembly which is able to avoid a distortion to be caused in a head rest support member that supports a head rest.

It is another object of the present invention to provide a vehicle seat back assembly which is simple in construction, highly reliable in operation and low in manufacturing cost.

According to one aspect of the present invention, there is provided a vehicle seat back assembly comprising: a seat back frame including, at both sides thereof, at least side frames; a head rest support member supported with upper distal ends of the side frames to be rotatable; a pressure receiving member supported with the head rest support member and remaining in a position to receive an impact load caused by a rear-end collision of a vehicle; a head rest holder supported with the head rest support member; and a head rest supported with the head rest holder to be moveable in upper and lower directions. The head rest support member has an upper wall segment, a rear facing wall segment bent from the upper wall segment and extending downward, and a support section supporting the head rest holder at the upper wall segment and a portion extending from the rear facing wall segment.

Other and further features, advantages, and benefits of the present invention will become more apparent from the following description taken in conjunction with the following drawings.

DETAILED DESCRIPTION OF THE PREFERRED EMBODIMENT

Figure 1:
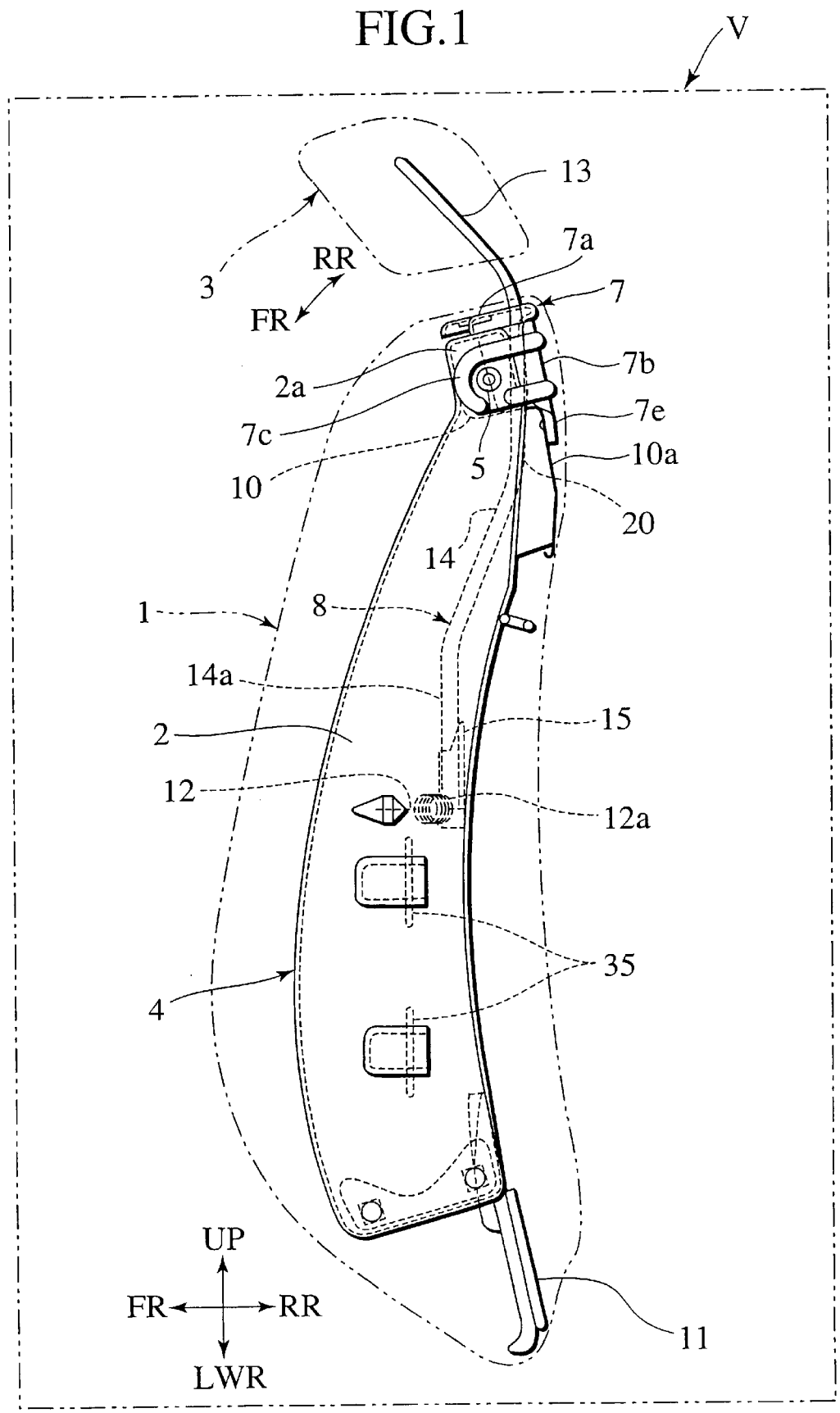
FIG. 1 is a side view of a vehicle seat assembly of an embodiment according to the present invention.

To describe the present invention more in detail, a vehicle seat back assembly of an embodiment of the present invention will be explained below with reference to the drawings wherein symbols FR, RR, UP and LWR refer to a front side or direction, a rear side or direction, an upper side or direction and a lower side or direction, in a vehicle V, respectively.

Referring to FIGS. 1 to 7, the vehicle seat back assembly, which is generally II designated at 1, has a head rest 3.

The vehicle seat back assembly 1 is constructed of a seat back frame 4, a head rest support member 7, a pressure receiving member 8 and head rest holders 9.

The seat back frame 4 includes a pair of laterally spaced upright side frames 2, 2 each made of steel plate, an upper cross member 10 made of steel plate with a C-shaped channel configuration in cross section and braced in a substantially horizontal direction between front faces of upper distal ends 2a, 2a of the side frames 2, 2, and a lower cross member 11 made of steel plate and braced in a substantially horizontal direction between lower distal ends 2b, 2b of the side frames 2, 2, with the side frames 2, 2, the upper cross member 10 and the lower cross member 11 being mutually connected to and mutually supported with one another by means of welding at points GW.

Between the side frames 2, 2, a tension spring 12 is connected to generate urging force during a normal usage or the like and an S-shaped spring 35 is connected to be extendable in response to a load during a normal usage to provide a comfortable effect for a seat occupant such as a driver or passenger in the vehicle. The tension spring 12 is directly coupled between the side frames 2, 2, and the S-shaped spring 35 is coupled between the side frames 2, 2 via clips 17, 17.

The pressure receiving member 8 is constructed of a linear shank 14 which is fixedly secured to a front facing surface of a central position in a lateral direction of a rear facing wall segment 7b (which will be discussed later) of the head rest support member 7 by welding at points GW' and depends downward from the front facing surface, and a forwardly oriented web 14a which depends from a slightly and forwardly bent distal end of the linear shank 14 to provide a substantially "I" shaped configuration as viewed from a front side. A boundary area between the linear shank 14 and the forwardly oriented web 14a has a curved shank 20 which is bent forward as viewed from a side in FIG. 3. The pressure receiving member 8 is located at a position which receives a secondary impact load, following a rear-end collision, to be applied to the seat occupant resting against the seat back assembly 1.

Further, a lower distal end 8a of the pressure receiving member 8 is covered with a pressure response segment 15 made of synthetic resin, with a rear facing surface of the pressure response segment 15 allowing the tension spring 12 to engage such that the lower distal end 8a of the pressure response member 8 is normally urged in a forward direction FR. That is, the rear facing wall segment 7b of the head rest support member 7 is normally urged in a direction to be held in abutting contact with a stopper surface 10a (which will be discussed later) of the upper cross member 10. Since a rear wall of the pressure response segment 15 is formed with a smooth surface with a less frictional resistance, the tension spring 12 is freely moveable over the smoothed surface in sliding engagement.

The tension spring 12 is formed in a wire shape and may have a substantially elliptical or substantially equilateral polygonal cross section to have a rotable property per se. More specifically, the tension spring 12 has two coil springs 12a which have spring forces such that the coil springs 12a do not expand from its normal length to preferably urge the lower distal end 8a of the pressure response member 8 in the forward direction FR in the presence of a seat occupant's load, and such that the coil springs 12a are extendable from such a normal length responsive to the secondary impact load following the rear-end collision.

The head rest support member 7 is a unitary structure using a single member made of pressed steel plate extending in a lateral direction and is formed in a substantially reversed L-shape in cross section such that an upper wall segment 7a and the rear wall facing segment 7b are orthogonally oriented relative to one another. Further, the head rest support member 7 is ended with forwardly bent flanges 7c, 7c which project forward from the rear facing wall segment 7b. The flanges 7c, 7c have bores 7c', 7c', respectively, through which bushes 6, 6 extend in a lateral direction, and stepped bolts 5, 5 are inserted through the bushes 6, 6 to absorb a frictional sound and an impact force. Thus, the flanges 7c, 7c are pivotally supported with the upper distal ends 2a, 2a of the side frames 2, 2 of the seat back assembly 1 by means of the stepped bolts 5, 5 such that the pressure response segment 15 is moved in the forward and rearward directions FR, RR.

Figure 5:
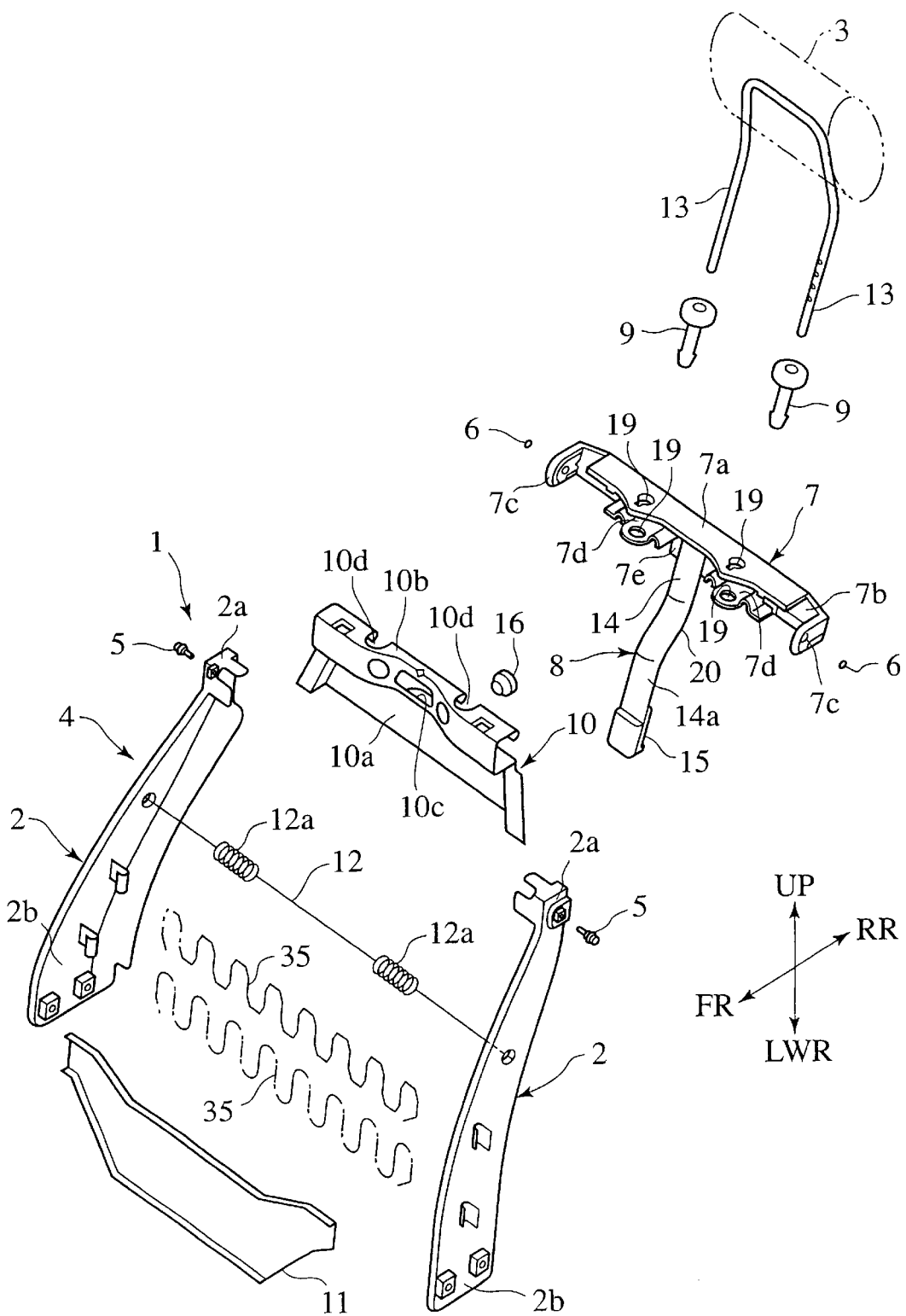
FIG. 5 is an exploded, perspective view of the vehicle seat back assembly shown in FIGS. 1 to 4.
Figure 6:
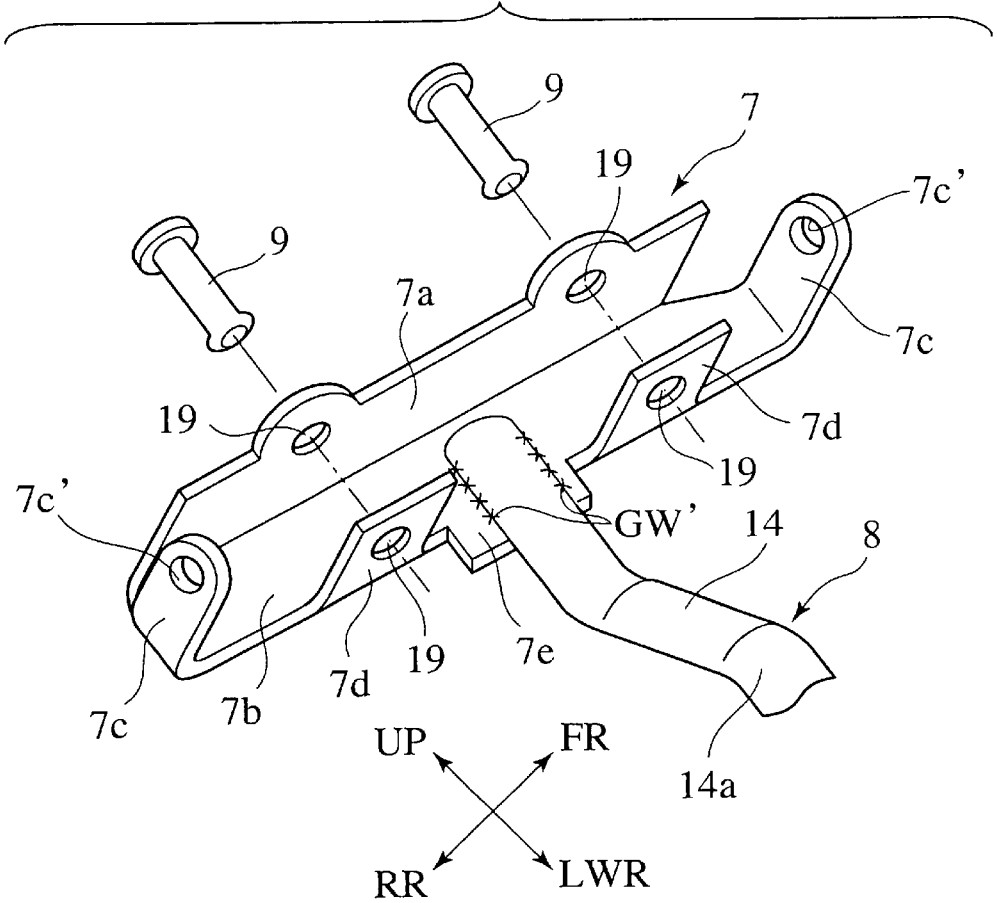
FIG. 6 is an exploded, perspective view of a head rest support member, shown in FIG. 5, as viewed from a lower side.
Figure 7:
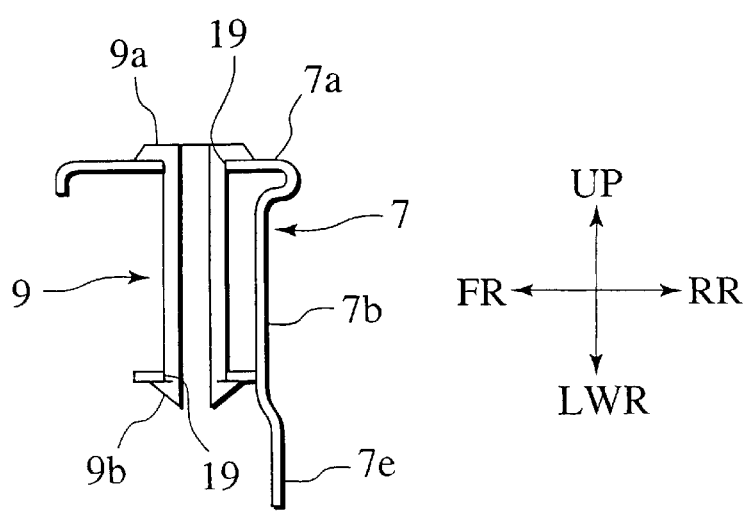
FIG. 7 is a cross sectional view illustrating a head rest holder assembled into the head rest support member shown in FIG. 6.

The upper wall segment 7a per se and brackets 7d, 7d, which are bent so as to project forward from the rear facing wall segment 7b, have a support section composed of first and second through-bores 19, 19, which are vertically aligned in coaxial and linear relationship, to allow head rest holders 9, 9 to be inserted in a manner as seen in FIGS. 5 to 7 and which are laterally spaced from one another. That is, the first upper through-bores 19 accommodate head portions 9a, 9a of the head rest holders 9, 9, with the lower through-bores 19, 19 engaging respective lower hook portions 9b, 9b.

Figure 2:
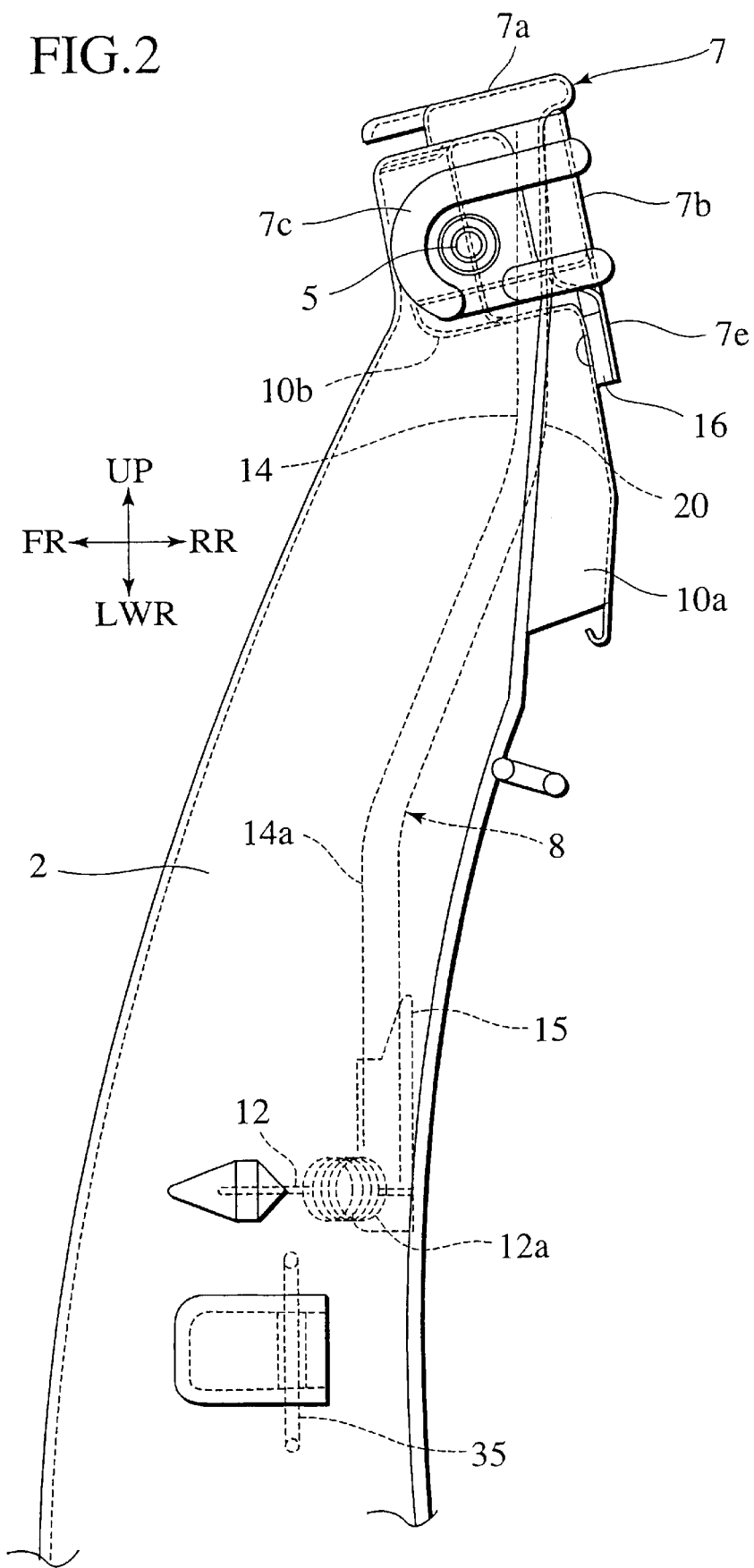
FIG. 2 is an enlarged side view of the vehicle seat back assembly shown in FIG. 1.

As shown in FIGS. 1, 2 and 5, the upper cross member 10 has a structure which is made of pressed steel plate that includes an upper wall section 10b extending in a lateral direction and the stopper surface 10a depending from the upper wall section 10b in the lower direction LWR, with the upper wall section 10b and the stopper surface 10a being formed in a unitary structure. The upper wall section 10b has a channel shape in cross section with its bottom wall facing in the forward direction FR and an open end facing in the rear direction RR. The stopper surface 10a depends downward from a lower distal end of the upper wall section 10b in a flat wall shape. A lower side wall component 10b' of the channel-shaped upper cross member 10 has a central area formed with an elongated opening 10c to allow the linear section 14 of the pressure receiving member 8 to be inserted for movement in the forward and rearward directions FR, RR. An upper side wall component 10b" of the upper cross member 10 has a pair of laterally spaced cutouts 10d, 10d to prevent interference with stays 13, 13 of a head rest 3.

Figure 3:
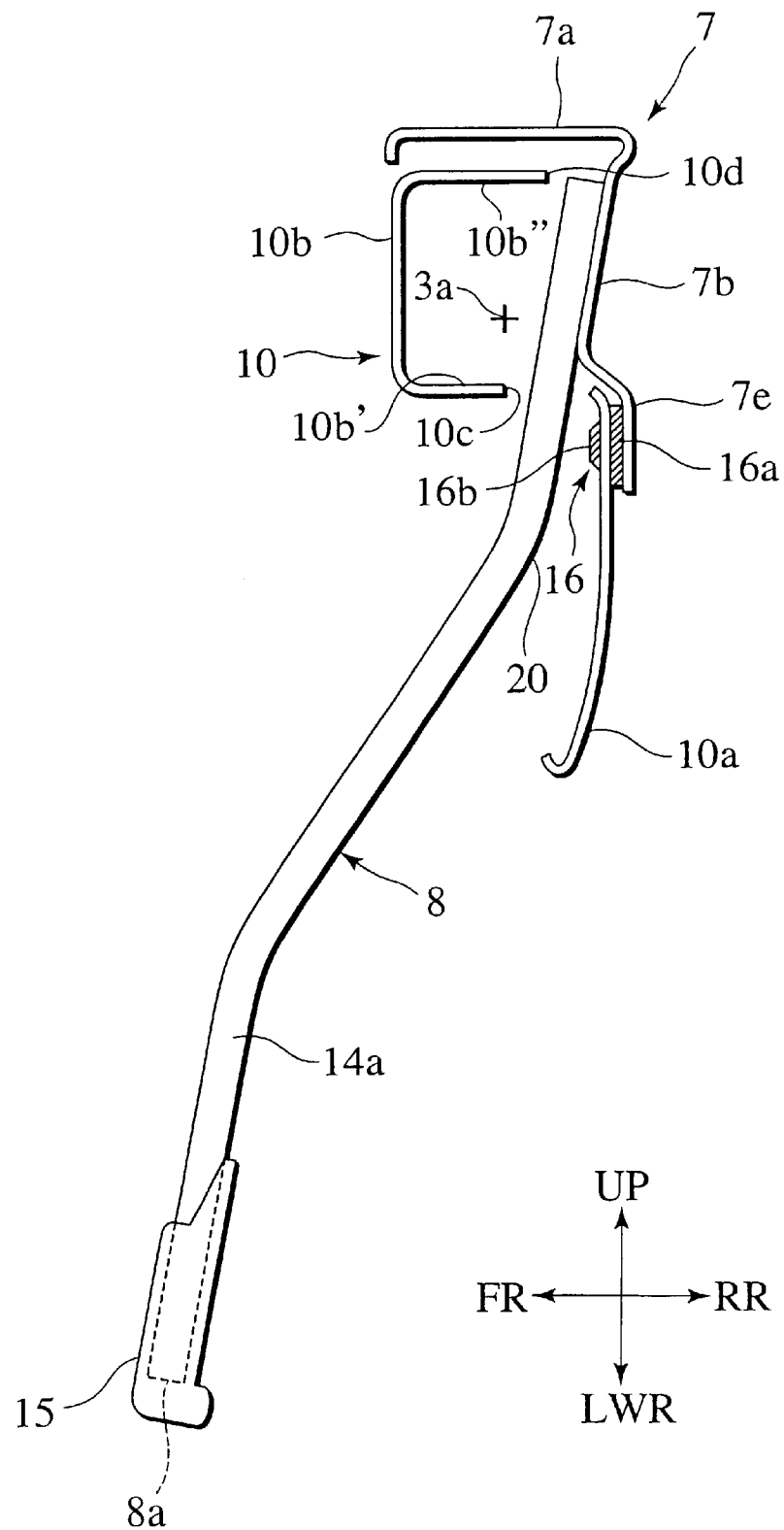
FIG. 3 is an enlarged side view of a pressure receiving member and associated component parts shown in FIG. 1.
Figure 4:
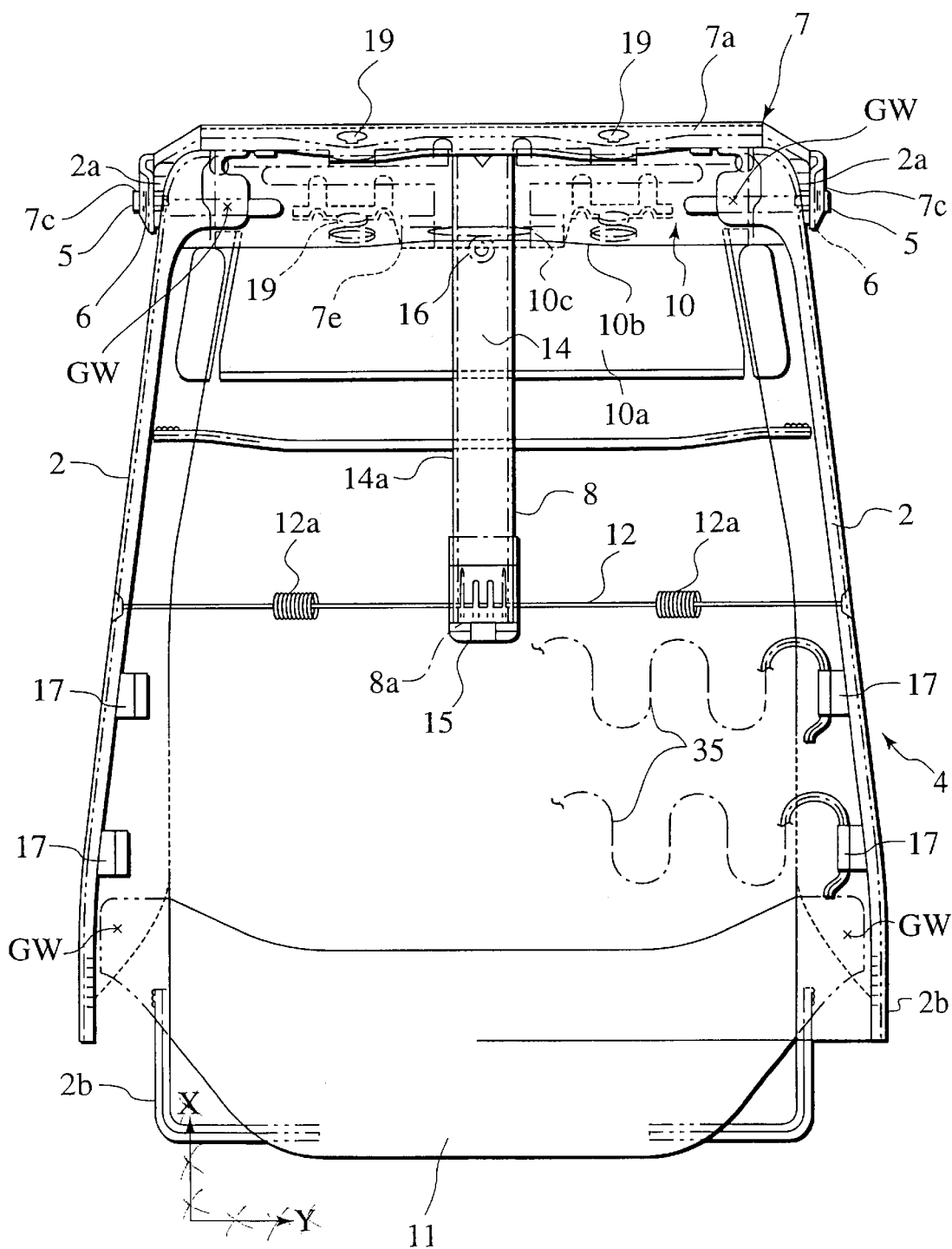
FIG. 4 is a front view of the vehicle seat back assembly shown in FIG. 1.

As seen in FIG. 3, a lower end 7e of the rear facing wall segment 7b of the head rest support member 7 vertically depends downward from a rear edge of the upper wall segment 7a and terminates at a position opposed to the stopper surface 10a which depends downward from the upper cross member 10. In FIG. 3, an upper end of the stopper surface 10a has a shock absorbing member 16 which includes a first shock absorber element 16a, with which the lower end 7e of the rear facing wall segment 7b is held in abutting engagement to prevent an excessive movement of the lower end 7e. Thus, the shock absorbing member 16 serves as a stopper which defines a rotational restricting position for the head rest support member 7 in the rearward direction RR.

To the contrary, the rear facing wall segment 7b of the head rest support member 7 functions to support the linear shank 14 of the pressure receiving member 8 such that as the head rest support member 7 rotates and the pressure receiving member 8 is moved closer to the stopper surface 10a, the rear surface of the pressure receiving member 8 is brought into abutting contact with a second shock absorber element 16b of the shock absorbing member 16 mounted to the stopper surface 10a to prevent the pressure receiving member 8 from being further excessively moved. Thus, the second shock absorber element 16b serves as a stopper which defines a rotational restricting position for the head rest support member 7 per se in the forward direction FR. The second shock absorber element 16b also serves as a support element to retain the shock absorbing member 16 to the stopper surface 10a.

As previously discussed, each of the head rest holders 9, 9 is made of synthetic resin and is fitted to the first and second through-bores 19, 19 of the head rest support member 7 for retaining the stays 13, 13 of the head rest 3. Each of the head rest holders 9, 9 has a well known stopper mechanism to enable the movement of the stay 13 in the upper and lower direction in a suitable manner while allowing the stay 13 to be fixedly retained at suitable fixed positions.

The linear shank 14 extends in a vertical shape as viewed from the front side and is retained at a position rearward RR of the upper cross member 10 such that, when the vehicle encounters the rear-end collision and the seat occupant is urged toward the seat back assembly 1 from the front side FR, shoulder points of the seat occupant does not interfere with the liner shank 14.

Incidentally, the pressure receiving member 8 is located in a position in close proximity to the back of the seat occupant, which is not shown, shaped in a thin flat configuration in the forward and rearward directions FR, RR, and has a given length in the vertical direction.

Now, the operation of the vehicle seat back assembly 1 of the present embodiment is described below in detail. The seat back assembly 1 normally remains in a condition shown in FIGS. 1 to 3. Since, in this instance, the pressure response segment 15 of the lower distal end 8a of the pressure receiving member 8 is urged in the forward direction FR by the action of the tension spring 12, the rear facing wall segment 7b of the head rest support member 7, which supports the pressure receiving member 8, is held in abutting engagement with the stopper surface 10a of the upper cross member 10 via the shock absorbing member 16, thereby retaining the head rest 3 via the head rest holders 9, 9 supported with the head rest support member 7.

Under a driving condition where the seat occupant takes a seat cushion, which is not shown, of a seat assembly constructed of the aforementioned seat back assembly 1 combined with the seat cushion with the seat occupant's back portion remaining in a position separate from the seat back assembly 1, a full space is formed between the seat occupant's head and the head rest 3, and a gap is defined between the seat occupant's back portion and the pressure receiving member 8. In an actual practice, since there is an inboard pad and a cover member, which are not shown, the seat occupant's back portion is held in intimate contact with the cover member. In an event that the seat occupant takes an action to rest on the seat back assembly 1 in a relaxed phase, also, a load applied by the seat occupant's back portion is implied to the S-shaped springs 35 via the inboard pad to softly receive the seat occupant's back portion due to the resilient cushioning effect of the pad and the S-shaped springs 35. Thus, it is possible to obtain a highly improved comfortable seating property. At this instant, of course, the load is not exerted to the pressure receiving member 8.

Under this circumstance, if the vehicle encounters the rear-end collision, then an impact load is exerted in the forward direction FR and the seat occupant receives such impact load in the forward direction FR to be thrown out from the seat back assembly 1. In a subsequent step, the seat occupant is imparted with an aft directed load in the rearward direction RR, i.e., a secondary impact load (a secondary collision). Since, in this instance, the magnitude of the impact following the secondary collision exceeds the load at which the coil spring 12a of the tension spring 12 begins to expand from its normal length, the coil springs 12a of the tension spring 12 are caused to expand, thereby allowing the pressure response segment 15 of the lower distal end 8a of the pressure receiving member 8 to be moved in the rearward direction RR.

Figure 8:
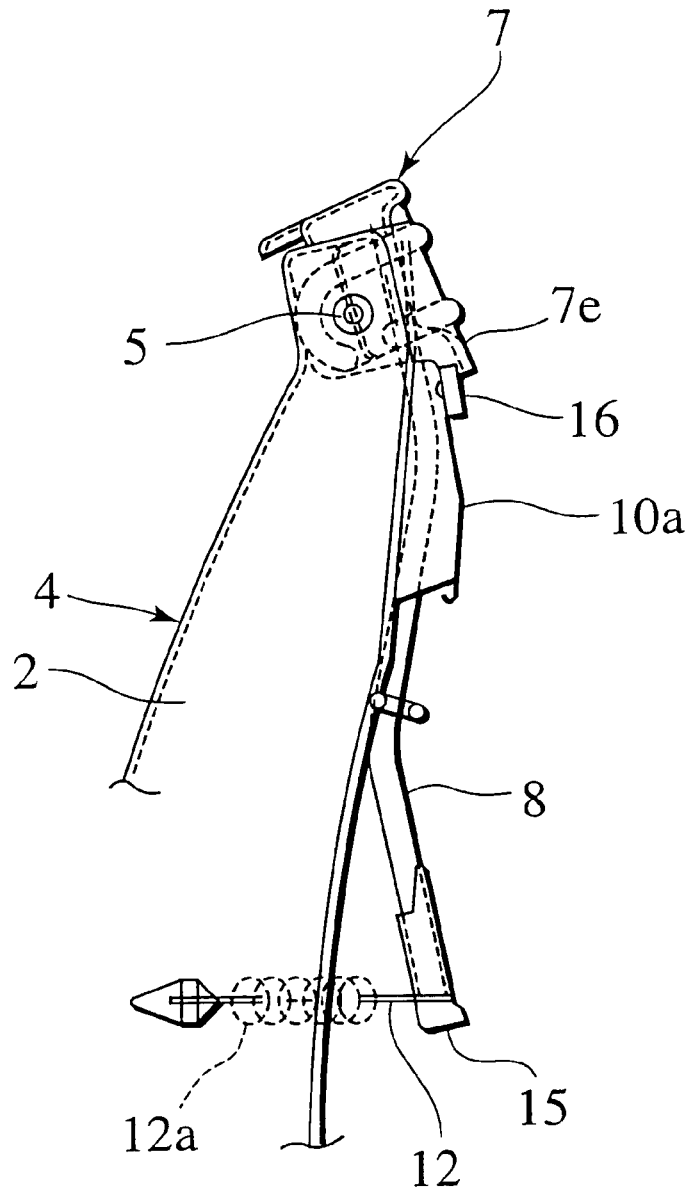
FIG. 8 is a side view of the vehicle seat back assembly, shown in FIG. 1, with the seat back assembly being shown in an operative state.
Figure 8:
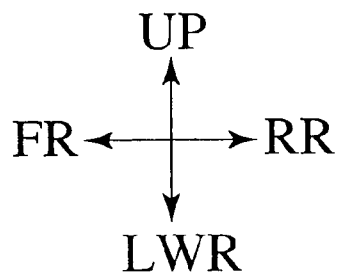
Figure 9:
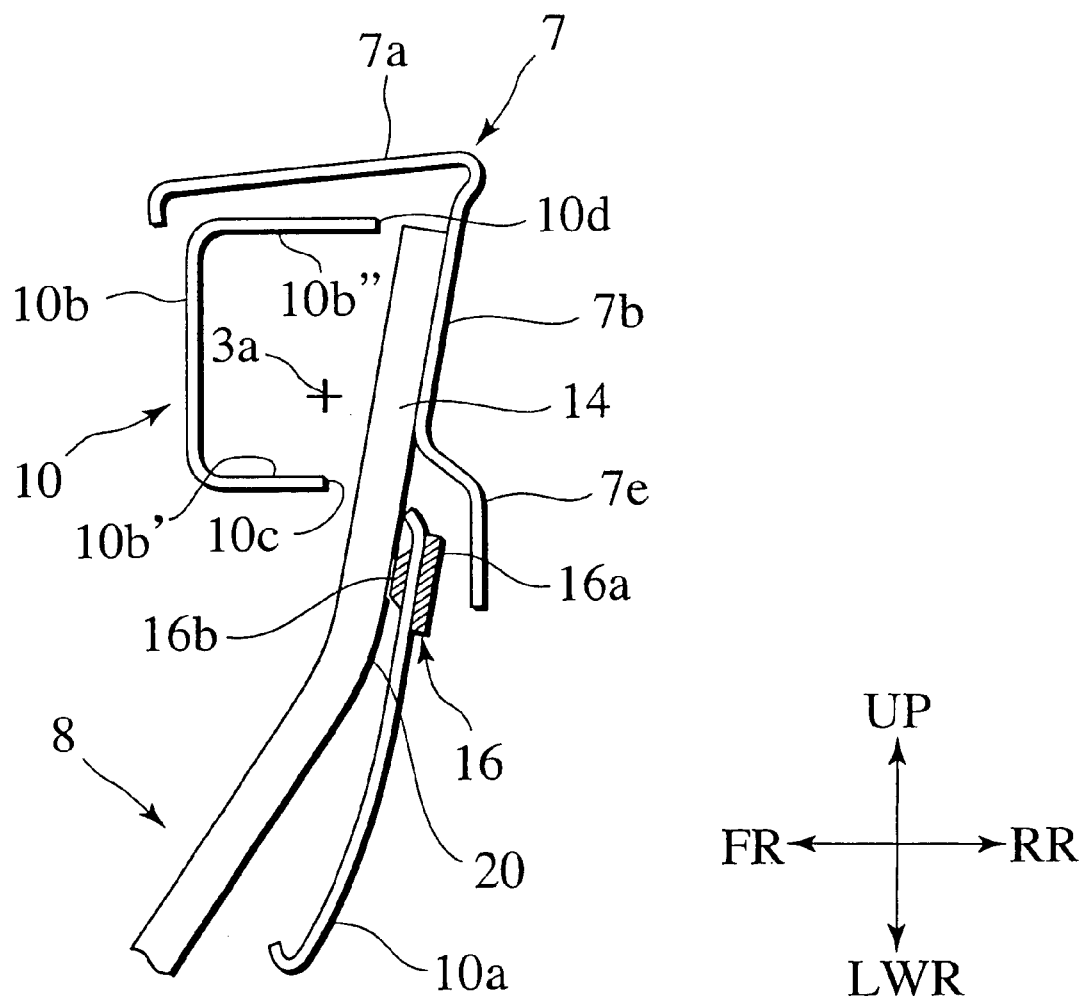
FIG. 9 is an enlarged cross sectional view of essential components parts shown in FIG. 8.

Movement of the lower distal end of the pressure receiving member 8 in the rearward direction RR allows the forwardly extending flanges 7c, 7c of the head rest support member 7 to rotate in the forward direction FR about the stepped bolts 5, 5 and the associated bushes 6, 6 as seen in FIGS. 8 and 9. When this occurs, the head rest holders 9, 9 supported with the head rest support member 7 is caused to rotate in the forward direction FR together with the head rest support member 7, thereby controlling the rotation of the stays 13, 13, held by the head rest holder 9, together with the head rest 3 in the forward direction FR toward the rear side RR of the seat occupant's head to allow the head rest 3 to reliably retain the seat occupant's head to enable a protection for the seat occupant's neck portion. It is a matter of course that such a rotational control is achieved in an instantaneous manner.

Since the rotational center 3a of the head rest 3 is aligned in coaxial relationship with the stepped bolts 5, 5 fixed to the side frames 2, 2 and the stepped bolts 5, 5 are located at the position rearward RR of the seat back assembly 1, there is no interference on the seat occupant who sits in the front side FR of the seat back assembly 1, with no extraneous feeling being imparted to the seat occupant. Further, in a case where the pressure receiving member 8 is exerted with the load owing to the secondary collision of the seat occupant, since the pressure receiving member 8 is caused to rotate about the centers of the upper distal ends 2a, 2a of the side frames 2, 2, respectively, the pressure receiving member 8 remains in the position to prevent the seat occupant's shoulder from interfering the pressure receiving member 8. In other word, the head rest 3 is enabled to move in the forward direction FR to reliably retain the seat occupant's neck portion.

Further, since the inboard pad, which is not shown, of the seat back assembly 1 does not bite the linear shank 14 of the pressure receiving member 8, the linear shank 14 is allowed to smoothly move in a rear surface of the inboard pad and the lift up of the inboard pad following the rotational movement of the linear shank 14 is not avoided, thereby ensuring a full amount of actuating displacement of the head rest 3.

It will thus be seen that when the seat occupant's back portion is moved in the rearward direction RR owing to the impact load, the head rest 3 is forced to move in the forward direction FR to reliably retain the seat occupant's head that would behave in a remaining action. Under such a condition, also, since the curved shank 20 remaining at the lower end of the linear shank 14 is bent forward, the movement of the pressure receiving member 8 in the rearward direction RR prevents the pressure receiving member 8 from projecting in the rearward direction RR, thereby keeping an enough space relative to the seat occupant.

Since, further, the stays 13, 13 of the head rest 3 are supported to be moveable upward or downward relative to the head rest holders 9, 9, it is possible for the head rest 3 to be suitably adjusted in a vertical direction so as to cope with various positions of the heads of the seat occupants of different physical features.

Furthermore, since the seat back assembly 1 has a rectangular configuration formed with the side frames 2, 2, the upper cross member 10 and the lower cross member 11, the strength of the seat back assembly 1 is remarkably increased, thereby effectively preventing the head rest support member 7, which supports the pressure receiving member 8 that is subject to the secondary collision, from being deformed.

Also, the pressure receiving member 8 is urged in the forward direction FR and not operative with the load caused by the seat occupant's sitting attitude while the pressure receiving member 8 is surely operative only in response to the impact load responsive to the rear-end collision. Thus, under the normal sitting condition or during the relaxed condition of the seat occupant, the tension spring 12 does not expand in response to the load caused by resting phase of the seat occupant's back portion and the S-shaped springs 35, 35 are effective to retain the seat occupant's back portion in a comfortable fashion. Also, upon receipt of the impact load due to the secondary collision caused by the rear-end collision, the coil springs 12a, 12a of the tension spring 12 are enabled to further expand, thereby permitting the pressure receiving member 8 to move in a reliable manner without any difficulties caused in the movement thereof.

When the head rest 3 is rotated in the forward direction FR during the secondary collision to assume the position to enable the protection for the seat occupant's neck portion, the pressure receiving member 8 supported with the head rest support member 7 is brought into abutting engagement with the second shock absorbing element 16b of the shock absorbing member 16 supported by the stopper surface 10a of the upper cross member 10. When this occurs, since the rotational angle of the head rest 3 in the forward direction FR can be limited, it is possible for an excessive rotational displacement of the head rest 3 in the forward direction FR to be effectively avoided. That is, the presence of the single piece of the shock absorbing member 16 enables the determination of an upright stop position and a forward tilt-stop position, with a resultant reduction in a manufacturing cost. Another advantage resides in that it becomes easy to provide a highly accurate positional precision.

Also, since the tension spring 12 is moveable along the pressure receiving member 8 in a sliding relationship in upper and lower directions, the stress of the tension spring 12 is decreased to reduce the reactive force, thereby allowing a further smooth rotation of the head rest support member 7.

Since the pressure response segment 15 of the pressure receiving member 8 is made of synthetic resin, the tension spring 12 is allowed to slide in a smooth manner in the upper and lower directions, thereby producing no sliding noises.

Since the pressure receiving member 8 associated with the seat occupant's back portion for receiving the impact load following the rear-end collision is formed in the substantially "I" shape as viewed from the front side, the pressure receiving member 8 has no projections and allows an actuating plate for receiving the pressure to become useless, making it possible to use a single piece of the pressure receiving member 8 with a low cost and with a remarkable reduction in weight.

Since the head rest support member 7, which supports the head rest holders 9, 9 supporting the head rest 3, is constructed of a unitary structure of the upper wall segment 7a, the rear facing wall segment 7b and the brackets 7d, there are no need for respective support elements for respective component parts, thereby preventing a distortion that would be otherwise caused by the respective support elements. Accordingly, there is no unbalance in the operating forces of the stays 13, 13 of the head rest 3, thereby making it possible to obtain stable operating forces of the head rest at all times.

Another important advantage of the vehicle seat back assembly of the present invention involves the presence of the first and second through-bores 19, 19 unitarily formed in the head rest support member 7 whereby the head rest 3 is enabled to smoothly move in upward or downward directions to eliminate the generation of the sliding noises.

While, in the description of the above operation of the vehicle seat back assembly of the present invention, the seat occupant's head has been discussed as being reliably retained with the movement of the head rest, the head rest 3 and the seat back assembly 1 are caused to move relative to one another and, even when the vehicle seat back assembly 1 is moved in the rearward direction RR, the head rest 3 is not moved relative to the seat occupant's head and remains in a protecting position suited for protecting the head of the seat occupant.

The entire content of a Patent Application No. TOKUGAN 2000-331117 with a filing date of Oct. 30, 2000 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A vehicle seat back assembly comprising:

a seat back frame including, at both sides thereof, at least side frames;

a head rest support member supported with the side frames to be rotatable, while connecting the side frames together;

a pressure receiving member supported with the head rest support member and remaining in a position to receive an impact load caused by a rear-end collision of a vehicle;

a head rest holder supported with the head rest support member; and a head rest supported with the head rest holder to be moveable in upper and lower directions, wherein the head rest support member has an upper wall segment, a rear facing wall segment bent from the upper wall segment and extending downward, and a support section supporting the head rest holder at the upper wall segment and a portion extending from the rear facing wall segment.

2. A vehicle seat back assembly according to claim 1, wherein the support section has a first through-bore formed in the upper wall segment to support an upper distal end of the head rest holder and a second through-bore formed in a bracket extending from the rear facing wall segment of the head rest support member to accommodate a lower distal end of the head rest holder.

3. A vehicle seat back assembly according to claim 2, wherein the bracket is bent from the rear facing wall segment of the head rest support member and extends forward.

4. A vehicle seat back assembly according to claim 1, wherein the head rest support member has a rotational support portion below the upper distal ends of the side frames such that the head rest support member is rotatable with respect to the side frames, and the rotational support portion is bent from the rear facing wall segment of the head rest support member and extends forward corresponding to the side frames.

5. A vehicle seat back assembly according to claim 1, wherein the seat back frame further includes an upper cross member extending between the upper distal ends of the side frames, a lower cross member lower than the upper cross member and extending between the side frames, and a tension spring supported between the side frames.

6. A vehicle seat back assembly according to claim 5, wherein the pressure receiving member connects to the tension spring, and the tension spring allows the head rest support member to move to a protecting position in response to the rear-end collision while applying an urging force, which is directed forward, to the pressure receiving member.

7. A vehicle seat back assembly according to claim 5, wherein the upper cross member has a stopper wall extending downward to limit movement of the head rest support member.

8. A vehicle seat back assembly according to claim 7, wherein the stopper wall includes a shock absorbing member to be in contact with the rear facing wall segment of the head rest support member and the pressure receiving member, respectively.

9. A vehicle seat back assembly according to claim 5, wherein the upper cross member restricts a rotational position of the head rest support member in a rearward direction, while cooperating with the rear facing wall segment of the head rest support member.

10. A vehicle seat back assembly according to claim 5, wherein the upper cross member restricts a rotational position of the head rest support member in a forward direction, while cooperating with the pressure receiving member.

* * * * *